US006088120A

United States Patent [19]
Shibusawa et al.

[11] Patent Number: 6,088,120
[45] Date of Patent: Jul. 11, 2000

[54] PRINTER MANAGING APPARATUS, PRINTER SYSTEM AND PRINTER SETTING METHOD

[75] Inventors: Toshihiko Shibusawa; Kazunori Nishihara, both of Kanagawa, Japan

[73] Assignee: Fuji Xerox Co., Ltd., Tokyo, Japan

[21] Appl. No.: 08/824,852

[22] Filed: Mar. 26, 1997

[30] Foreign Application Priority Data

Mar. 27, 1996 [JP] Japan .................................. 8-071829
Mar. 27, 1996 [JP] Japan .................................. 8-071833

[51] Int. Cl.[7] .......................... B41B 15/00; B41D 15/00; G06F 15/00
[52] U.S. Cl. ........................................................... 358/1.15
[58] Field of Search .................................... 395/112, 114, 395/856, 859, 882, 884, 885, 892, 101, 113, 200.03, 200.08, 200.01

[56] References Cited

U.S. PATENT DOCUMENTS 5,220,674  6/1993  Morgan et al. ........................... 395/800
5,559,933  9/1996  Boswell .................................... 395/114

FOREIGN PATENT DOCUMENTS

59-87539   5/1984   Japan .
4-369713   12/1992  Japan .
5-303475   11/1993  Japan .

Primary Examiner—Leo H. Boudreau
Assistant Examiner—Dmitry A. Novik
Attorney, Agent, or Firm—Finnegan, Henderson, Farabow, Garrett & Dunner, L.L.P.

[57] ABSTRACT

A printer managing apparatus includes a physical printer managing unit for managing the outputting of the attribute information of individual physical printers and controlling the outputting of a job to the physical printers, a logical printer attribute information generating unit for logically selecting the attribute information of the physical printer from the physical printer managing unit for managing attribute information of physical printers to generate attribute information of a logical printer, and a logical-printer attribute-information managing unit for managing the generated attribute information of the logical printers. With such an arrangement, the attribute information set in the logical printer is obtained from the attribute information of the individual physical printers that form the logical printer. Therefore, the attribute information of the logical printer may more properly be set than by a manager.

8 Claims, 8 Drawing Sheets

| ATTRIBUTE VALUE OF LOGICAL PRINTER | PHYSICAL PRINTER | ATTRIBUTE VALUE OF PHYSICAL PRINTER |
|---|---|---|
| a-top | a | top-tray |
| a-bottom | a | bottom-tray |
| b-top | b | top-tray |
| b-middle | b | middle-tray |
| b-large | b | large-capacity-tray |

| | PDL | PAPER SIZE | FINISHING |
|---|---|---|---|
| PRINTER A | PS | A4 | NO |
| PRINTER B | PS AND PCL | A4, B4 | NO |
| PRINTER C | PCL | A4 | NO |
| PRINTER D | PCL | A4, B4, A3 | STAPLING |

FIG. 8

| | PDL | PAPER SIZE | FINISHING |
|---|---|---|---|
| VIRTUAL PRINTER A | PS | A4, B4 | NO |
| VIRTUAL PRINTER B | PCL | A4, B4, A3 | STAPLING |

FIG. 9

PRINTER MANAGING APPARATUS, PRINTER SYSTEM AND PRINTER SETTING METHOD

BACKGROUND OF THE INVENTION

The present invention relates to a printer managing apparatus, a printer system and a printer setting method, and more particularly to a printer managing apparatus with a logical printer which enables a client to handle a plurality of physical printers as a single printer, a printer system having a plurality of printers, and a printer setting method for grouping the plurality of printers.

The technology of developing network systems such as a personal computer LAN is in progress now. In such a network system, computing services which are flexible and have a wide range of applications are provided and all resources connected to the network have to be effectively utilized with cooperation among them. Particularly, because resources such as printers are frequently used, easy to use high quality services must be provided for users.

Windows NT (Trade Mark of Microsoft Corp. of U.S., hereinafter this indication is omitted) has been widely accepted the mainstream among those network systems. A logical printer is one of the printer services offered by Windows NT. The logical printer means an environment in which a plurality of physical printers have been grouped together. By introducing the logical printer concept, it becomes possible to provide a user with a service of the sort that allows a job fed into the logical printer to be outputted from a not-printing physical printer which is automatically selected.

However, because the plurality of physical printers thus grouped together, printer drivers corresponding to only printers having equal output capabilities are used, and consequently all the physical printers in the group most have equal output capabilities.

Therefore, it has not been feasible to group physical printers having different output capabilities. Assuming that, for example, a physical printer is capable of outputting printing papers of A4 and B4 in size and another physical printer is capable of outputting a printing paper of only A3, these two physical printers have not been able to be grouped to constitute a logical printer.

Also, in a network system, when a client issues a print job, a print server managing a plurality of printers selects a printer for executing the print job in accordance with a designated printer or print attribute. For the handling of the plurality of printers, there is a technique in which a plurality of printers are handled as a single printer by grouping those printers (for example, Japanese Patent Unexamined Publication Nos. Sho. 59-87539 and Hei. 5-303475). For the determination of a printer to be used, there is a proposal in which since the printers have various attributes, the assignment of a job to a printer is determined on the basis of the attribute of the printer (for example, Japanese Patent Unexamined Publication No. Hei. 4-369713).

When a virtual logical printer formed by grouping a plurality of physical printers is registered, it is necessary to set an attribute value in the logical printer. However, since various kinds of attributes are present, when a manager sets the attribute information in a logical printer depending on the attribute information of the physical printers, it is very difficult to set up the attribute information of the logical printer without any contradiction to the attribute information of the physical printers that form the logical printer.

SUMMARY OF THE INVENTION

The present invention has been made in view of the above described problems, and an object of the present invention is to provide a printer managing apparatus in which when the combination of a plurality of physical printers is handled as a single virtual logical printer, the attribute information of the logical printer can be set up in harmony with the attribute information of individual physical printers.

Another object of the present invention is to provide a printer system for grouping physical printers having different output capabilities together.

Still another object of the present invention is to provide a printer setting method for grouping physical printers having different output capabilities together.

According to a first aspect of the invention, a printer managing apparatus with a logical printer enables a client to handle a plurality of physical printers as a single printer, and comprises job receiving means for accepting a job from a client; job control means for queuing the accepted job to manage a process necessary for executing the job; physical printer managing means for managing the attribute information of the individual physical printers and for controlling the output of a job to a selected physical printer; logical-printer attribute-information generating means for logically selecting the attribute information of the physical printers to generate the attribute information of the logical printer; and logical-printer attribute-information managing means for managing the generated attribute information of the logical printer.

According to a second aspect of the invention, a printer system having a plurality of printers comprises condition setting means for setting conditions necessary for presenting a user with the plurality of printers as one printer; output capability acquisition means for acquiring the output capabilities that is supported by each of the printers; printer condition decision means for deciding whether the printer satisfies the conditions from the conditions and the output capabilities acquired; grouping control means for grouping the printers together when the conditions are satisfied; and printer presentation control means for presenting the user with the printers thus grouped together.

According to a third aspect of the invention, a printer setting method for grouping a plurality of printers together comprises the steps of setting conditions necessary for presenting users with the plurality of printers as one printer, acquiring the output capabilities that each of the printers supports, deciding whether the printer satisfies the conditions from the conditions and the whole output capability acquired, adding the printer to a printer list for grouping the printers when the conditions are satisfied, and presenting the user with the printer listed in the printer list.

DETAILED DESCRIPTION OF THE INVENTION

Figure 1:
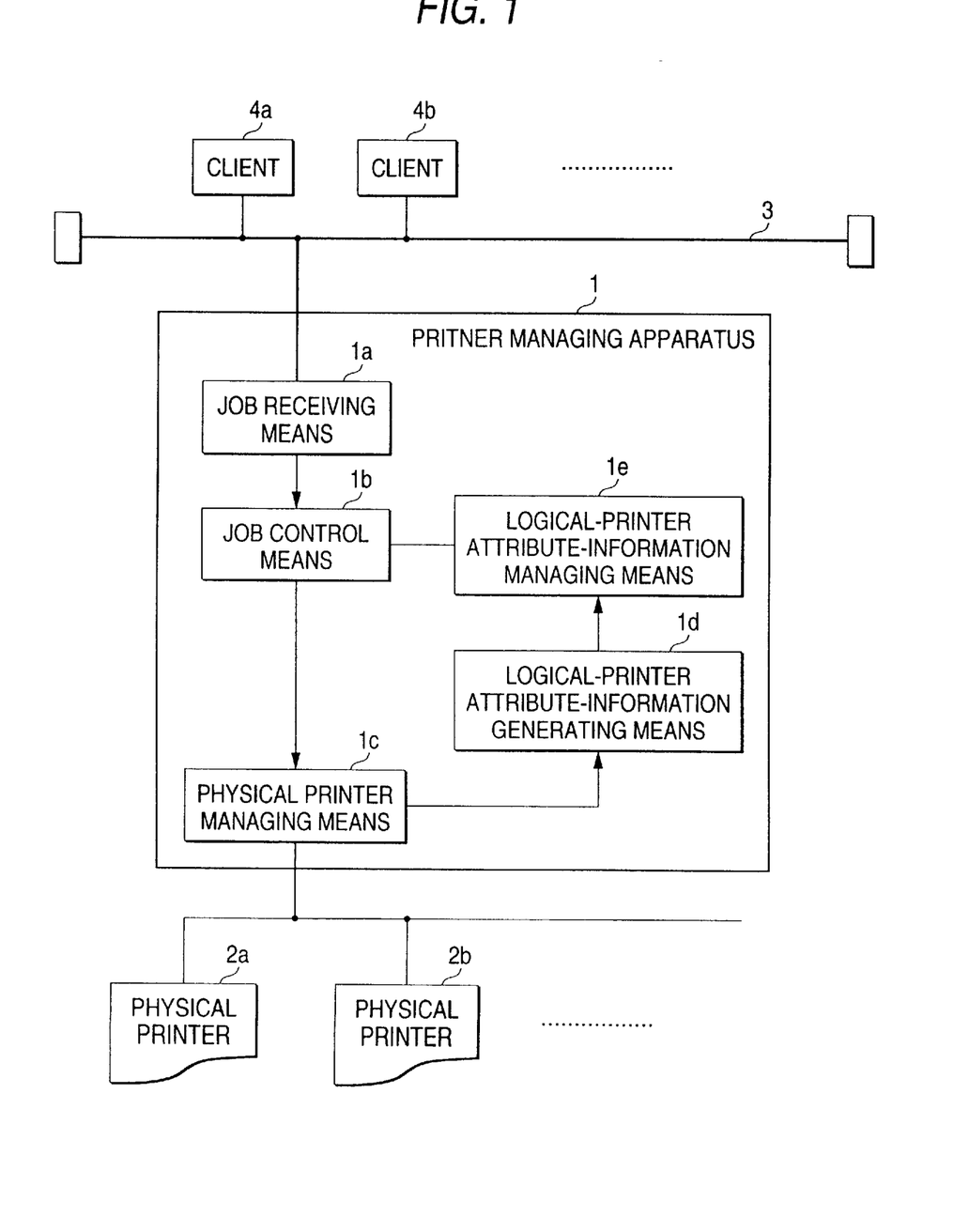
FIG. 1 is a block diagram useful in explaining the principle of a printer managing apparatus according to the present invention.

FIG. 1 is a block diagram useful in explaining the principle of a printer managing apparatus according to the present invention.

A printer managing apparatus 1 constructed according to the present invention is connected to a plurality of physical printers 2a, 2b, . . . as objects forming a logical printer, and a plurality of clients 4a, 4b, . . . which issue and transmits jobs through a network 10. The printer managing apparatus 1 is made up of job receiving means 1a for receiving and accepting jobs issued from the clients 4a, 4b, . . . , job control means 1b for queuing the job accepted by the job receiving means 1a to manage a process necessary for executing the job, physical printer managing means 1c for managing the attribute information of the physical printers 2a, 2b, . . . and for controlling the outputting of the job to the selected physical printer, logical-printer attribute-information generating means 1d for logically selecting the attribute information of the physical printers managed by the physical printer managing means 1c to generate the attribute information of the logical printer, and logical-printer attribute-information managing means 1a for managing the attribute information of the logical printer that is generated by the logical-printer attribute-information generating means 1d.

In the printer managing apparatus 1, the attribute information, which corresponds to the attribute information of the individual physical printers 2a, 2b, . . . , is set in the logical-printer attribute-information generating means 1e as the attribute information of the logical printer. The attribute information of the logical printer is obtained in a manner that the logical-printer attribute-information generating means 1d logically selects the attribute information of the physical printers 2a, 2b, . . . from the physical printer managing means 1c. For example, the logical selection of the attribute information on papers that can be output by the physical printers 2a, 2b, . . . is based on the sum of sets of the attribute information. For example, the logical selection of the attribute information on papers that the physical printers 2a, 2b, . . . can use at present is based on the product of sets of the attribute information.

Each of the clients 4a, 4b, . . . issues a job to a logical printer associated with a plurality of physical printers in accordance with a kind of the attribute information, not to the physical printers 2a, 2b, . . . . In this case, to match the attribute information of the logical printer to the attribute information of the physical printers, the relationship between the attribute information of the plurality of physical printers and the attribute information of the logical printer is managed using a physical/logical printer table in the logical-printer attribute-information managing means 1e.

In the printer managing apparatus of the invention, the attribute information to be set in the logical printer is selected from the attribute information of the individual physical printers 2a, 2b, . . . that form the logical printer, by the logical-printer attribute-information generating means 1d. In other words, the attribute information of the logical printer is based on the attribute information of the physical printers 2a, 2b, . . . . Therefore, the attribute information can be set in the logical printer without any contradiction to the attribute information of the physical printers 2a, 2b, . . . .

A print server into which the present invention is incorporated will next be described as a preferred embodiment of the present invention.

Figure 2:
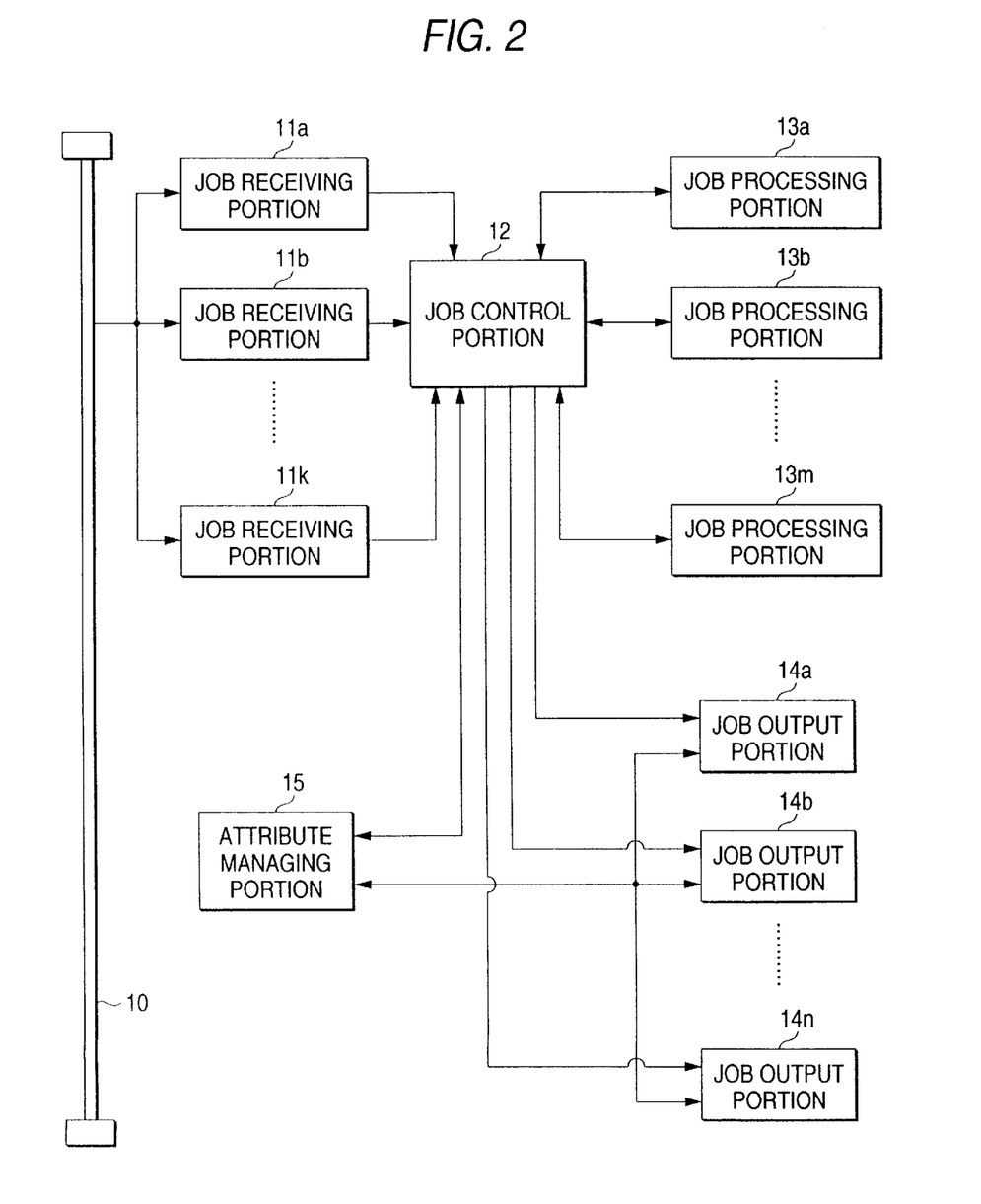
FIG. 2 is a block diagram showing an arrangement of a print server.

FIG. 2 is a block diagram showing an arrangement of a print server incorporating the present invention thereinto.

The print server is made up of a plurality of job receiving portions 11a, 11b, . . . , 11k connected to a network 0, a job control portion 12, a plurality of job processing portions 13a, 13b, . . . , 13m, a plurality of job outputting portions 14a, 14b, . . . , 14n provided corresponding to the physical printers, and an attribute managing portion 15.

The job receiving portions 11a, 11b, . . . , 11k are arranged so as to receive and accept different job formats, respectively. When a job is input to the print server through the network 10, the job receiving portion that can accept the job format of the received job receives the job and converts the job format into a job format of the print server, and 1s transfers the job to the job control portion 12. Upon receipt of the job, the job control portion 12 queues the job and requests the job processing portions 13a, 13b, . . . , 13m to carry out a process necessary for executing the job. The job processing portions 13a, 13b, . . . , 13m have the following processing functions; for example, a format conversion processing for converting a print format to another print format, an image processing for rasterizing a page description language into bit map data, and an informing processing for informing asynchronously occurring events.

Then, the job control portion 12 accesses the attribute managing portion 15 to acquire the attribute information of a physical printer specified by the attribute of the job to be executed, or whose execution is required, from the attribute managing portion, selects the physical printer, and requests the selected physical printer to execute the job, through the job outputting portions 14a, 14b, . . . , 14n. The attribute managing portion 15 is so arranged as to respond to an attribute inquiry from the job control portion 12. Further, the attribute managing portion is connected to the job outputting portions 14a, 14b, . . . , 14n so as to receive changes of the attribute information of the physical printers. The detailed arrangement of the attribute managing portion 15 will be described hereunder.

Figure 3:
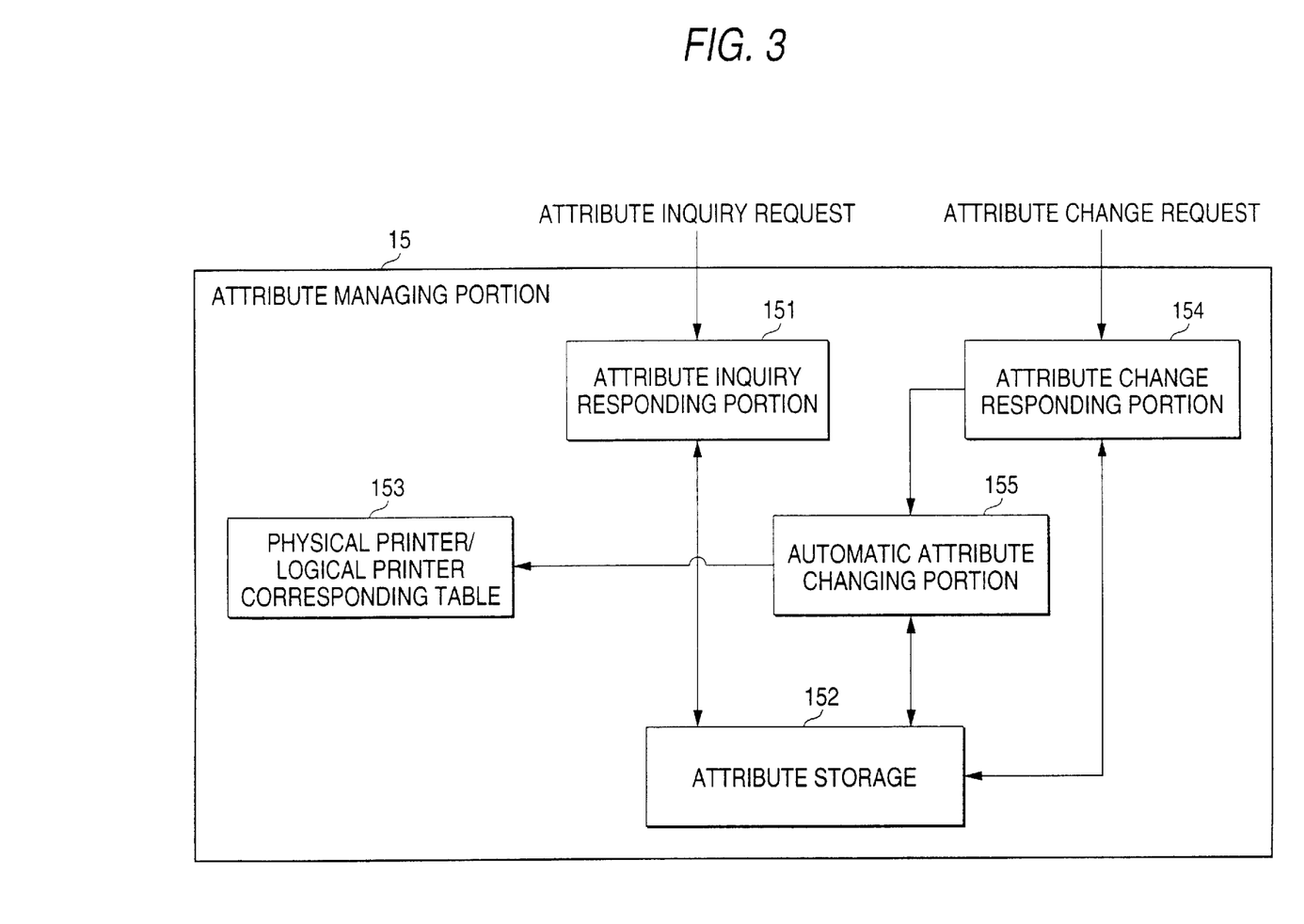
FIG. 3 is a block diagram showing an arrangement of an attribute managing portion in the print server.

FIG. 3 is a block diagram showing an arrangement of the attribute managing portion in the print server.

The attribute managing portion 15 is made up of an attribute inquiry responding portion 151 connected to the job control portion 12, an attribute storage 152, which has a data base function, for storing attribute information of the logical printers and the physical printers, a physical/logical printer table 153, an attribute change responding portion 154 connected to the job outputting portions 14a, 14b, . . . , 14n, and an automatic attribute changing portion 155.

When receiving an attribute inquiry from the job control portion 12, the attribute inquiry responding portion 151 accepts the attribute inquiry to read out data corresponding to the attribute of an object, such as a job whose execution is required or the printer, from the attribute storage 152, and informs the job control portion 12 of it.

When the attribute of the physical printer is changed, for example, a paper tray or a paper size is changed, the job outputting portion associated with the physical printer outputs an attribute change request. The attribute change responding portion 154 receives the attribute change request, accesses the attribute storage 152 to change the attribute of the object corresponding to the attribute change request, and informs the automatic attribute changing portion 155 of the attribute change. Upon receipt of the attribute change notice from the attribute change responding portion 154, the automatic attribute changing portion 155 operates in the following way when the changed attribute is that of the physical printer. That is, the automatic attribute changing portion 155 refers to the physical/logical printer table 153, lists up the logical printers affected by the attribute change, generates new attribute values calculated by a calculating method corresponding to the changed attribute, and alters the corresponding object attribute stored in the attribute storage 152.

A calculating method for calculating an attribute value of the logical printer, which is generated anew in the automatic attribute changing portion 155 when the physical printer and/or the attribute of the physical printer are changed, will be described.

In the physical printer, the exchanging of a paper tray is one of the indispensable operations. In a case where an attribute representative of the sets of media (papers) that physical printers can output in their specifications is obtained as an attribute of the logical printer, it is obtained as the sum of sets of the attribute values of the physical printers, which form a logical printer. If two physical printers "a" and "b" are provided and designed so as to accept the following types of papers:

Physical printer "a": A4, B4, A3

Physical printer "b": A5, A4, by summing the sets of those papers, an attribute value of the logical printer is Logical printer=A5, A4, B4, A3.

Thus, all types of papers that the logical printer can output can be set as an attribute of the logical printer. The attribute is used for such a case where a type of paper is specified and any physical printer, if it has the attribute, may be used for its output.

In a case where the sets of papers that the physical printers can output are obtained as an attribute of a logical printer, it is obtained as the product of sets of the attributes of the physical printers that form the logical printer. If two physical printers "a" and "b" are provided and designed so as to accept the following types of papers:

Physical printer "a": A4, B4, A3

Physical printer "b": A5, A4, by multiplying the sets of those papers, an attribute value of the logical printer is Logical printer=A4

Thus, the type of paper that at present any physical printer can output can be set as an attribute of the logical printer.

Figure 4:
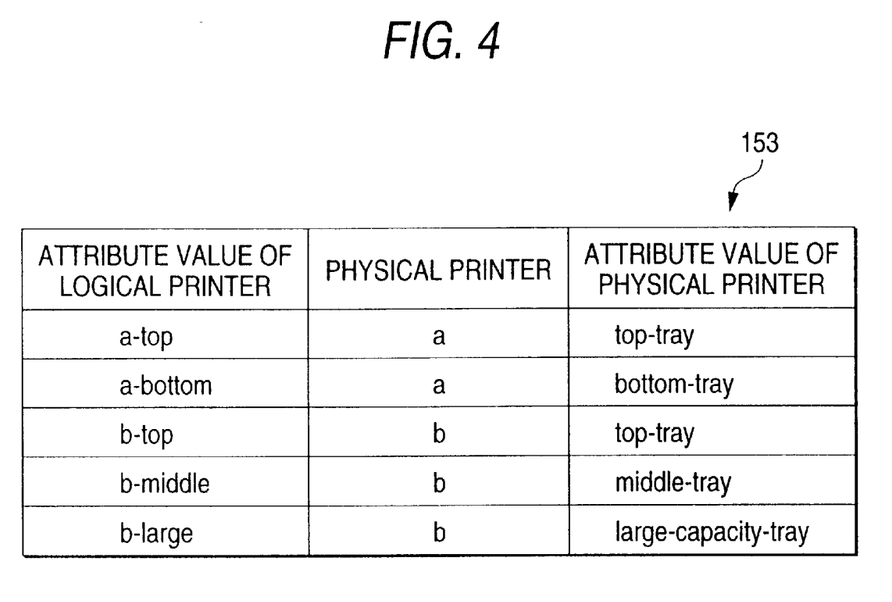
FIG. 4 is a diagram showing a physical/logical printer table.

Also when a plurality of physical printers are managed in the form of one logical printer, it is necessary to provide the logical printer in the form of the physical printer to the client. However, where an attribute of a paper tray is designated, even if only a top tray is designated, a physical printer to which the top tray belongs is unknown. Therefore, it is necessary to make the client discriminate the physical printer of the top tray by some information. It is to this end that the physical/logical printer table 153 is used. The contents of the physical/logical printer table 153 will be described hereunder by way of example.

FIG. 4 is a diagram showing a physical/logical printer table.

As shown, the physical/logical printer table 153 contains "attribute value of physical printer", "physical printer", and "attribute value of logical printer". In the table, two physical printers "a" and "b" are provided and designed so as to accept the following types of paper trays:

Physical printer "a": [top-tray], [bottom-tray]

Physical printer "b": [top tray], [middle-tray], [large-capacity-tray].

The attribute value of the logic printer is:

Logic printer=[a-top], [a-bottom], [b-top], [bmiddle], [b-large]

As seen from the foregoing description, a printer managing apparatus of the present invention includes logical printer attribute information generating means for logically selecting the attribute information of physical printers from physical printer managing means for managing attribute information of physical printers to generate attribute information of a logical printer, and logical-printer attribute-information managing means for managing the generated attribute information of the logical printers. Therefore, the attribute information set in the logical printer is not contradictory to the attribute information of the individual physical printers which form the logical printer.

Figure 5:
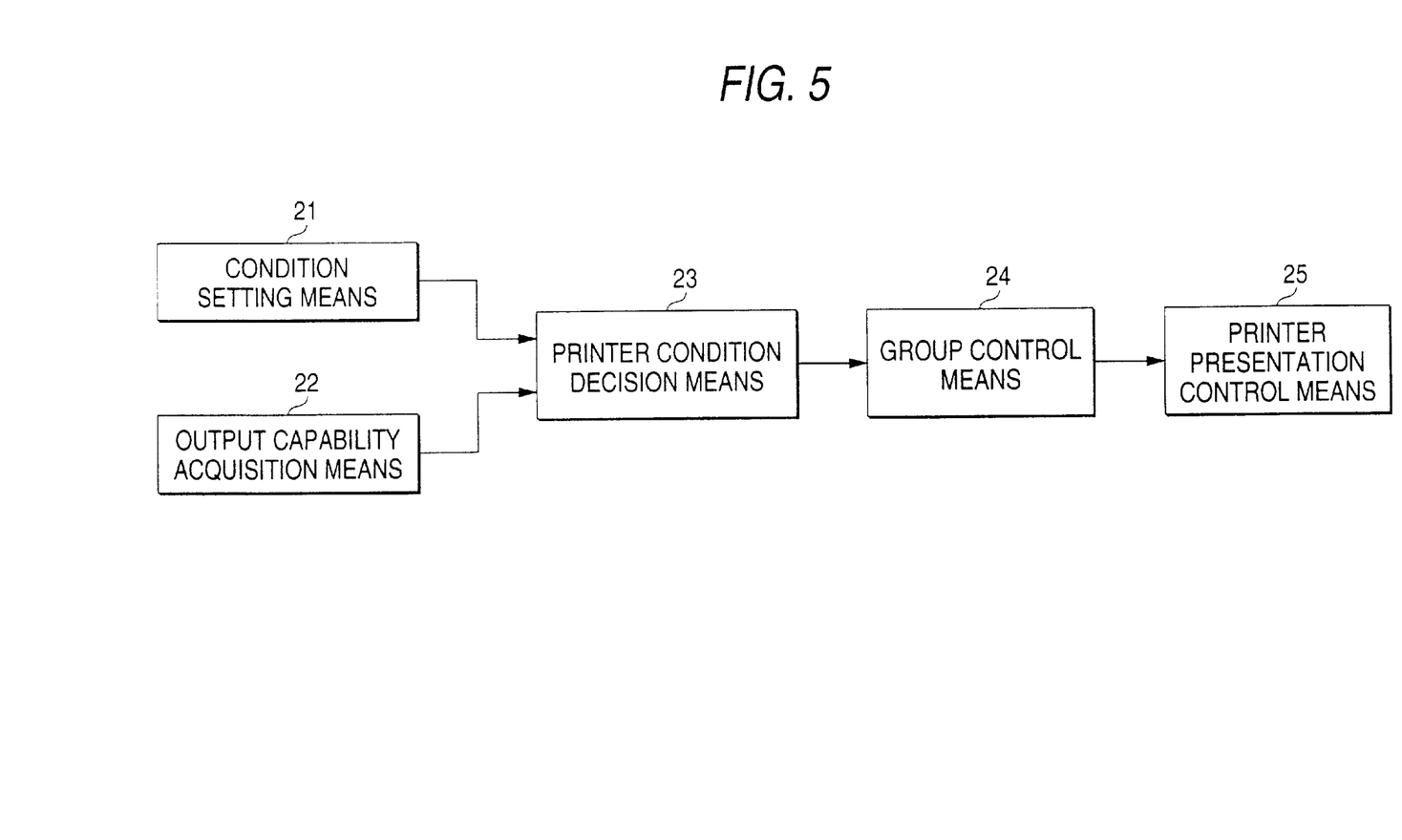
FIG. 5 is a block diagram illustrating the principle of a printer system according to the present invention.

Another embodiment of the present invention will subsequently be described with reference to the accompanying drawings. FIG. 5 is a block diagram illustrating the principle of a printer system according to the present invention. The printer system comprises a condition setting means 21 for setting conditions necessary for presenting users with a plurality of printers as one printer, an output capability acquisition means 22 for acquiring the output capabilities of physical printers, a printer condition decision means 23 for deciding whether the output capabilities acquired satisfy the conditions, a grouping control means 24 for grouping physical printers together and a printer presentation control means 25 for presenting users with the above group of physical printers.

Since the condition setting means 21 presents users with the plurality of printers as one printer, it sets necessary output capabilities as conditions. The printer defined by the conditions will hereinafter be called a virtual printer.

Unlike the logical printer, the virtual printer represents a plurality of -physical printers having different output capabilities and is presented to users as one printer. A detailed description of the virtual printer will be given later.

The output capability acquisition means 22 acquires the output capabilities supported by each physical printer. Hereinafter, the output capabilities will be called "capabilities" in the following description.

The capabilities include, for example, paper size, PDL (Page Description Language), finishing, double-sided printing, and resolution.

The printer condition decision means 23 decides whether the acquired capabilities of a physical printer satisfy the set conditions of the virtual printer.

The grouping control means 24 groups physical printers satisfying the conditions of; the virtual printer together. Hereinafter, the grouping will be called "pooling" in the following description. The group of printers thus subjected to the pooling constitutes a virtual printer.

The printer presentation control means 25 presents users with the capabilities of the virtual printer thus defined. In other words, the plurality of physical printers pooled as the virtual printer are presented to users as if they appear to be one printer and are dealt with as the same.

Figure 6:
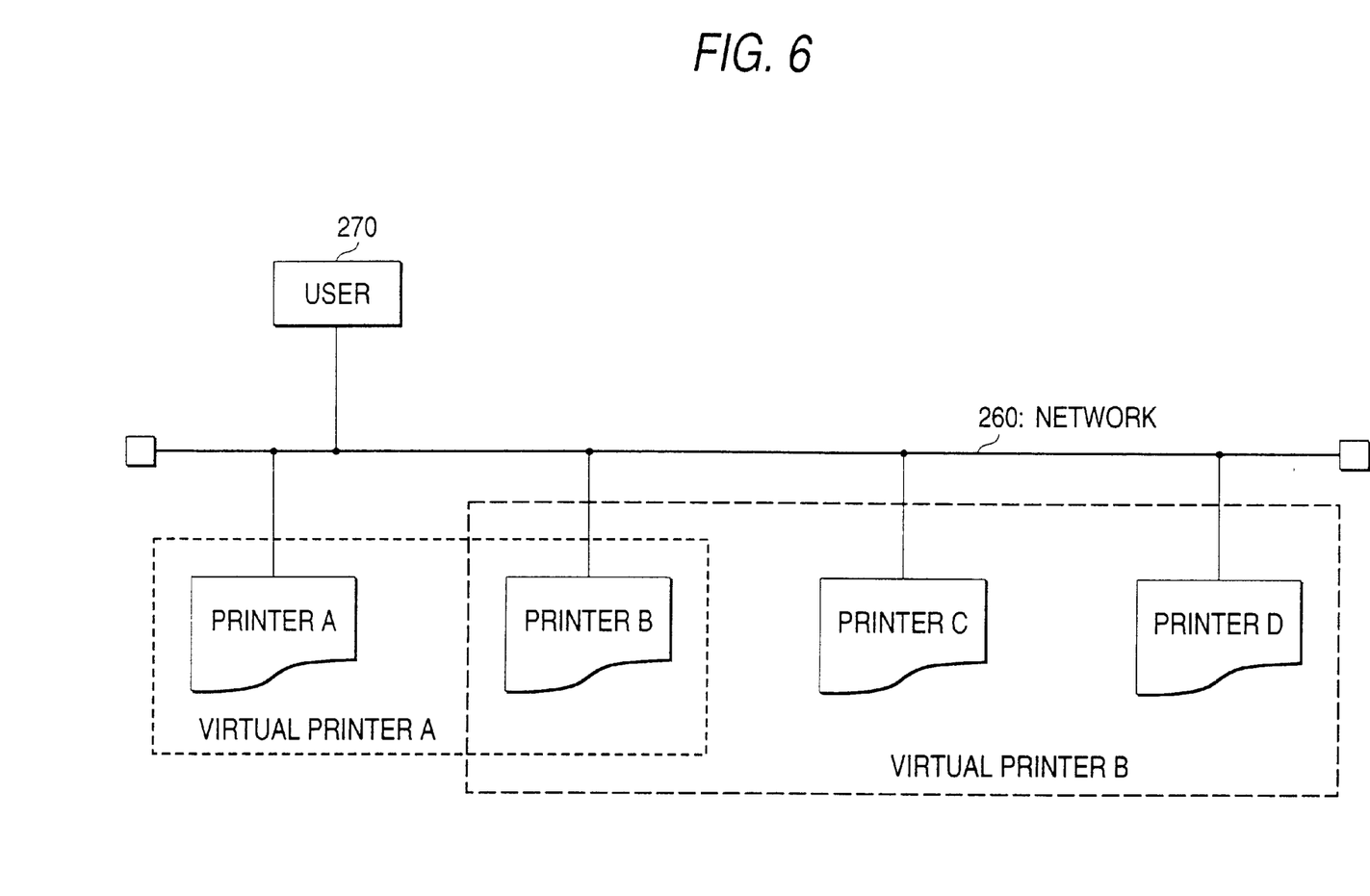
FIG. 6 is a conceptual diagram of virtual printers.

FIG. 6 is a conceptual drawing of virtual printers. A user 270 and printers A, B, C and D are connected over a network 260. The user 270 represents users of the system as a whole and the printers A, B, C and D are physical printers, respectively.

The printers A and B have been subjected to pooling and this group of printers is defined as a virtual printer A. Similarly, the printers B, C and D have also been subjected to pooling and this group of printers is defined as a virtual printer B.

According to a method of defining the virtual printer A, the capabilities are defined so that the printer A or B can deal with a demand for printing. According to a method of defining the virtual printer B, the capabilities are defined so that the printer B, C or D can deal with a demand for printing. By thus defining the virtual printers, the user 270 is allowed to utilize the printers A, B, C and D, and the virtual printers A, B.

Figure 7:
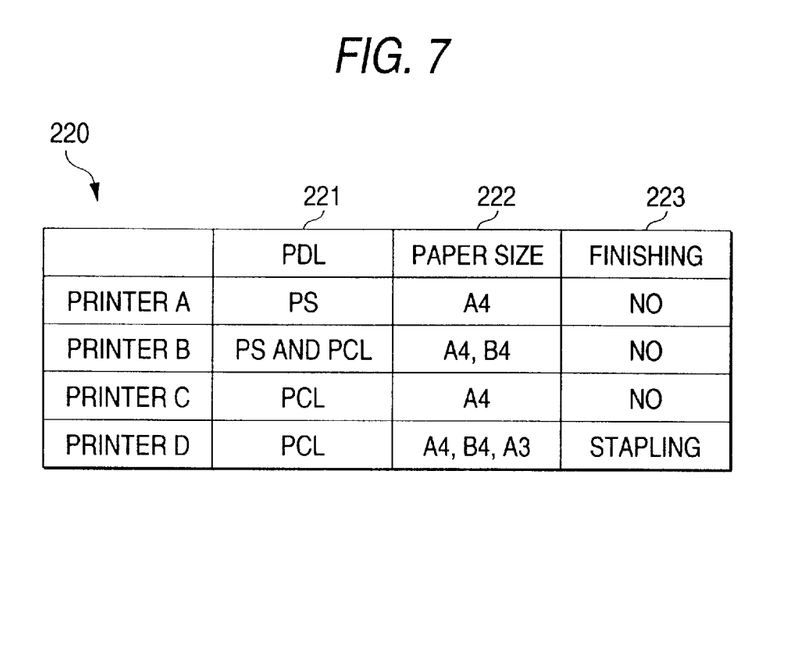
FIG. 7 is a table showing the capabilities of physical printers.

FIG. 7 is a table showing the capabilities of the physical printers. In Table 220 in FIG. 7, there are displayed PDL 221, paper size 221 and finishing 223 as capabilities with respect to the printers A, B, C and D. The capabilities of the printer A include PS (PostScript: Trade Mark of Adobi Systems Corp. of U.S., hereinafter this indication will be omitted) as PDL 221 and paper size 222 of A4 but no finishing 223. The capabilities of the printer B Include PS & PCL (Printer Control Language: Trade Mark of Hewlett-Packard Co. of U.S., hereinafter this indication will be omitted) as PDL 221 and paper size 222 of A4 and B4 but no finishing 223. The capabilities of the printer C include PCL as PDL 221 and paper size 222 of A4 but no finishing 223. The capabilities of the printer D include PCL as PDL 221, paper size 222 of A4, B4 and A3, and stapling papers together as finishing 223. In this manner, the virtual printer is defined from the plurality of physical printers having different capabilities.

Figure 8:
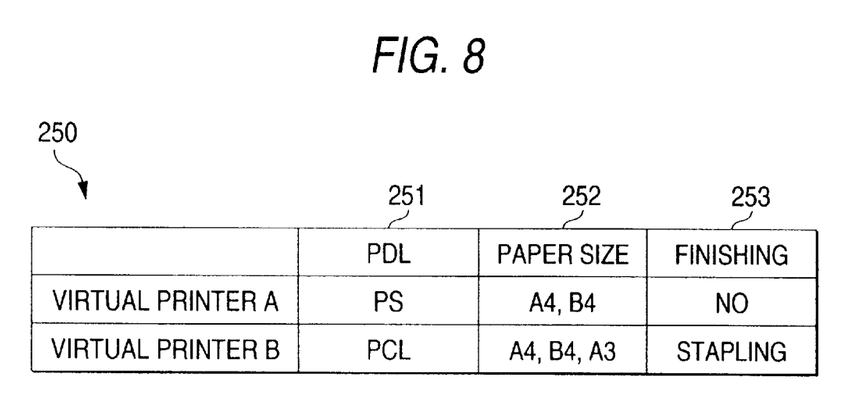
FIG. 8 is a table showing the capabilities of virtual printers.

FIG. 8 is a table showing the capabilities of the virtual printers. In Table 250, there are shown cases where the printers A, B, C and D described in FIG. 7 are defined by the capability PDL to obtain the virtual printers. The capabilities of the virtual printer A include PS as PDL 251 and paper size 252 of A4, B4 but no finishing 253. The capabilities of the virtual printer B include PCL as PDL 251, paper size 252 of A4, B4 and A3, and stapling papers together as finishing 253.

When the user puts to the virtual printer B a demand for PCL, A4 and stapling papers together as the capabilities that it requires, the printer D is actually used. If the stapling papers together is unnecessary, usable one of the printers B, C and D will automatically be selected at a point of time when the demand for printing is placed.

Since the capabilities have been clearly defined when the virtual printer is used, moreover, a printer driver corresponding to the capabilities within the virtual printer is utilized. In other words, printer drivers for the virtual printer are used to manage and control the whole physical printer thus pooled.

Figure 9:
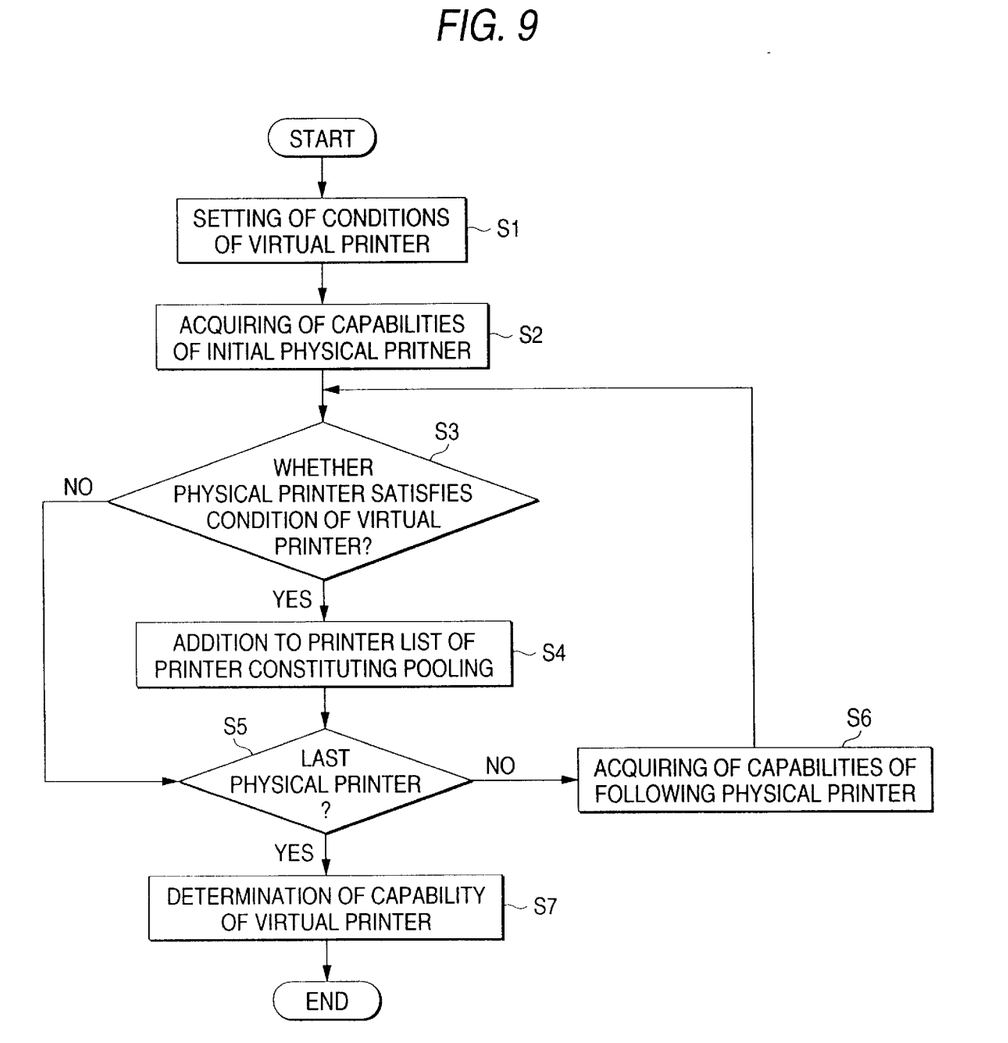
FIG. 9 is a flowchart illustrating a processing procedure according to the method of setting the virtual printer.

Next, a printer setting method for setting the virtual printer will be described by reference to a flowchart. FIG. 9 shows a flowchart illustrating a processing procedure according to the method of setting the virtual printer.

[S1] The user sets the conditions of the virtual printer. For example, the capability PS, which is PDL, is set as the condition of the virtual printer.

[S2] The capabilities of the initial physical printer are acquired.

[S3] A decision is made on whether the capabilities of the physical printer acquired satisfy the condition of the virtual printer. When the conditions are met, Step S4 is followed, whereas when the conditions are not met, Step S5 is followed.

[S4] The above physical printer forming the pooling is added to a printer list.

[5] A decision is made on whether a physical printer whose capabilities should be acquired is the last physical printer. When it is the last physical printer, Step S7 is followed, whereas when it is not the last physical printer, Step S6 is followed.

[S6] The capabilities of the following physical printer are acquired.

[S7] The completed printer list is then used to determine the capabilities of the virtual printer. In a case where the physical printer having capabilities including PS as PDL and paper size of B4 and the phusical printer having capabilities including PS and PCL as PDL and paper size of A4 constitute the printer list, a virtual printer having capabilities including PS as PDL and paper size of A4, B4 is determined.

As set forth above, the printing conditions that the user requires are set in the form of a virtual printer in the group of physical printers subjected to the pooling, whereby the virtual printer is such that the capabilities to be presented to the user can be set wider than those obtained by ANDing the capabilities of the group of physical printers subjected to the pooling. Moreover, the virtual printer is such that the user is allowed to easily grasp a printing demand that can actually be output in comparison with a case where the capabilities are simply ORed.

In the printer system according to the present invention, a plurality of physical printers are defined as a virtual printer and presented to users, so that physical printers having different capabilities can be pooled.

According to the printer setting method of the invention, the printing conditions that the user requires are set in the form of a virtual printer in the group of physical printers subjected to the pooling, so that physical printers having different capabilities can be pooled.

What is claimed is:

1. A printer managing apparatus with a logical printer which enables a client to handle a plurality of physical printers as a single printer, wherein each of said physical printers has attribute information, such as paper size or paper tray identification, corresponding to it, said apparatus comprising;

job receiving means for accepting a job from a client;

job control means for queuing the accepted job to manage a process necessary for executing the job;

physical printer managing means for managing the attribute information of the individual physical printers and for outputting the job to a selected physical printer;

logical-printer attribute-information generating means for logically selecting the attribute information of the physical printers from physical printer managing means to generate attribute information of the logical printer; and logical-printer attribute-information managing means for managing the generated attribute information of the logical printer, and wherein said logical-printer attribute-information generating means selects the attribute information corresponding to a plurality of physical printers from the logical sum of the attribute information of said plurality of physical printers, and generates attribute information as the attribute information of the logical printer.

2. A printer managing apparatus with a logical printer which enables a client to handle a plurality of physical printers as a single printer, wherein each of said physical printers has attribute information, such as paper size or paper tray identification, corresponding to it, said apparatus comprising;

job receiving means for accepting a job from a client;

job control means for queuing the accepted job to manage a process necessary for executing the job;

physical printer managing means for managing the attribute information of the individual physical printers and for outputting the job to a selected physical printer;

logical-printer attribute-information generating means for logically selecting the attribute information of the physical printers from physical printer managing means to generate attribute information of the logical printer;

logical-printer attribute-information managing means for managing the generated attribute information of the logical printer, and wherein said logical-printer attribute-information generating means selects the attribute information, which may be currently used, of a plurality of physical printers through a logical product of sets of the attribute information thereof, and generates the attribute information thereof, and generates the attribute information as the attribute information of the logical printer.

3. A printer managing apparatus with a logical printer which enables a client to handle a plurality of physical printers as a single printer, wherein each of said physical printers has attribute information, such as paper size or paper tray identification, corresponding to it, said apparatus comprising;

job receiving means for accepting a job from a client;

job control means for queuing the accepted job to manage a process necessary for executing the job;

physical printer managing means for managing the attribute information of the individual physical printers and for outputting the job to a selected physical printer;

logical-printer attribute-information generating means for logically selecting the attribute information of the physical printers from physical printer managing means to generate attribute information of the logical printer; and logical-printer attribute-information managing means for managing the generated attribute information of the logical printer, and wherein said logical-printer attribute-information generating means generates the attribute information of the logical printer in response to a change of the attribute information of any of the physical printers.

4. A printer managing apparatus with a logical printer which enables a client to handle a plurality of physical printers as a single printer, wherein each of said physical printers has attribute information, such as paper size or paper tray identification, corresponding to it, said apparatus comprising:

job receiving means for accepting a job from a client;

job control means for queuing the accented job to manage a process necessary for executing the job;

physical printer managing means for managing the attribute information of the individual physical printers and for outputting the job to a selected physical printer;

logical-printer attribute-information generating means for logically selecting the attribute information of the physical printers from physical printer managing means to generate attribute information of the logical printer; and logical-printer attribute-information managing means for managing the generated attribute information of the logical printer, and wherein said logical-printer attribute-information managing means manages the correspondence between the logical printer and physical printers that form the logical printer according to a table containing the relationship between the attribute information of the plurality of physical printers and the attribute information of the logical printer.

5. A method of managing attributes of a printer managing apparatus with a logical printer which enables a client to handle a plurality of physical printers as a single printer, wherein each of said physical printers has attribute information, such as paper size or paper tray identification, corresponding to it, comprising the steps of:

accepting a job from a client;

queuing the accepted job to manage a process necessary for executing the job;

managing the attribute information of the individual physical printers and outputting the job to a selected physical printer;

selecting the attribute information of the physical printers to generate attribute information of the logical printer, wherein said step of logically selecting includes selecting the attribute information corresponding to a plurality of physical printers from the sum of the attribute information of said plurality of physical printers, and generating attribute information as the attribute information of the logical printer; and managing the generated attribute information of the logical printer.

6. A method of managing attributes of a printer managing apparatus with a logical printer which enables a client to handle a plurality of physical printers as a single printer, wherein each of said physical printers has attribute information, such as paper size or paper tray identification, corresponding to it, comprising the steps of:

accepting a job from a client;

queuing the accepted job to manage a process necessary for executing the job;

managing the attribute information of the individual physical printers and outputting the job to a selected physical printer;

selecting the attribute information of the physical printers to generate attribute information of the logical printer, said step of selecting including selecting the attribute information, which may be currently used, of a plurality of physical printers through a logical product of sets of the attribute information thereof and generating the attribute information thereof, and generating the attribute information as the attribute information of the logical printer; and managing the generated attribute information of the logical printer.

7. A method of managing attributes of a printer managing apparatus with a logical printer which enables a client to handle a plurality of physical printers as a single printer, wherein each of said physical printers has attribute information, such as paper size or paper tray identification, corresponding to it, comprising the steps of;

accepting a job from a client;

queuing the accepted job to manage a process necessary for executing the job;

managing the attribute information of the individual physical printers and outputting the job to a selected physical printer;

selecting the attribute information of the physical printers to generate attribute information of the logical printer;

generating the attribute information of the logical printer in response to a change of the attribute information of any of the physical printers; and managing the generated attribute information of the logical printer.

8. A method of managing attribute information of a printer managing apparatus with a logical printer which enables a client to handle a plurality of physical printers as a single printer, wherein each of said physical printers has attribute information, such as paper size or paper tray identification, corresponding to it, comprising the steps of;

accepting a job from a client;

queuing the accepted job to manage a process necessary for executing the job;

managing the attribute information of the individual physical printers and outputting the job to a selected physical printer;

selecting the attribute information of the physical printers to generate attribute information of the logical printer; and managing the generated attribute information of the logical printer, said step of managing including managing the correspondence between the logical printer and physical printers that form the logical printer according to a table containing the relationship between the attribute information of plurality of physical printers and the attribute information of the logical printer.

* * * * *